United States Patent [19]
Gaither

[11] Patent Number: 6,083,576
[45] Date of Patent: Jul. 4, 2000

[54] DECORATIVE SUBMERSIBLE FISH TANK SCULPTURE

[76] Inventor: Robert S. Gaither, 1046 Via Coralla, San Lorenzo, Calif. 94580-2811

[21] Appl. No.: 09/169,749

[22] Filed: Oct. 9, 1998

[51] Int. Cl.⁷ ..................................................... A47G 1/12
[52] U.S. Cl. ...................... 428/13; 428/34.1; 428/34.4; 428/542.2; 264/320; 264/328.1; 119/253; 119/256; D30/101
[58] Field of Search ................................. 428/34.1, 34.4, 428/13, 542.2; 204/328.1, 320; 119/253, 256; D30/101, 106

[56] References Cited

U.S. PATENT DOCUMENTS

| | | |
|---|---|---|
| 4,318,945 | 3/1982 | Goldman et al. .......................... 428/15 |
| 4,385,088 | 5/1983 | Baskin ....................................... 428/15 |
| 4,708,089 | 11/1987 | Goldman et al. ......................... 119/5 |
| 4,820,556 | 4/1989 | Goldman et al. .......................... 428/7 |
| 4,974,545 | 12/1990 | Jones ......................................... 119/5 |
| 5,257,596 | 11/1993 | Jones ........................................ 119/256 |
| 5,970,918 | 10/1999 | Bargy ....................................... 119/245 |

*Primary Examiner*—Deborah Jones
*Assistant Examiner*—Abraham Bahta
*Attorney, Agent, or Firm*—Wells, St. John, Roberts, Gregory & Matkin, P.S.

[57] ABSTRACT

A decorative submersible sculpture is described in which a submersible hollow body is formed with a peripheral wall structure. The wall structure defines an internal receptacle of a prescribed decorative shape that is configured to be substantially filled by a visually opaque particulate medium and formed by the internal receptacle into the prescribed decorative shape. The wall structure is transparent and configured in such a manner that when the receptacle is substantially filled with visually opaque particulate medium, the medium takes the form of the prescribed decorative shape and is visible through the wall structure. The decorative shape will visually appear to be in a solid, self-supporting state, and the wall structure will be substantially invisible.

17 Claims, 6 Drawing Sheets

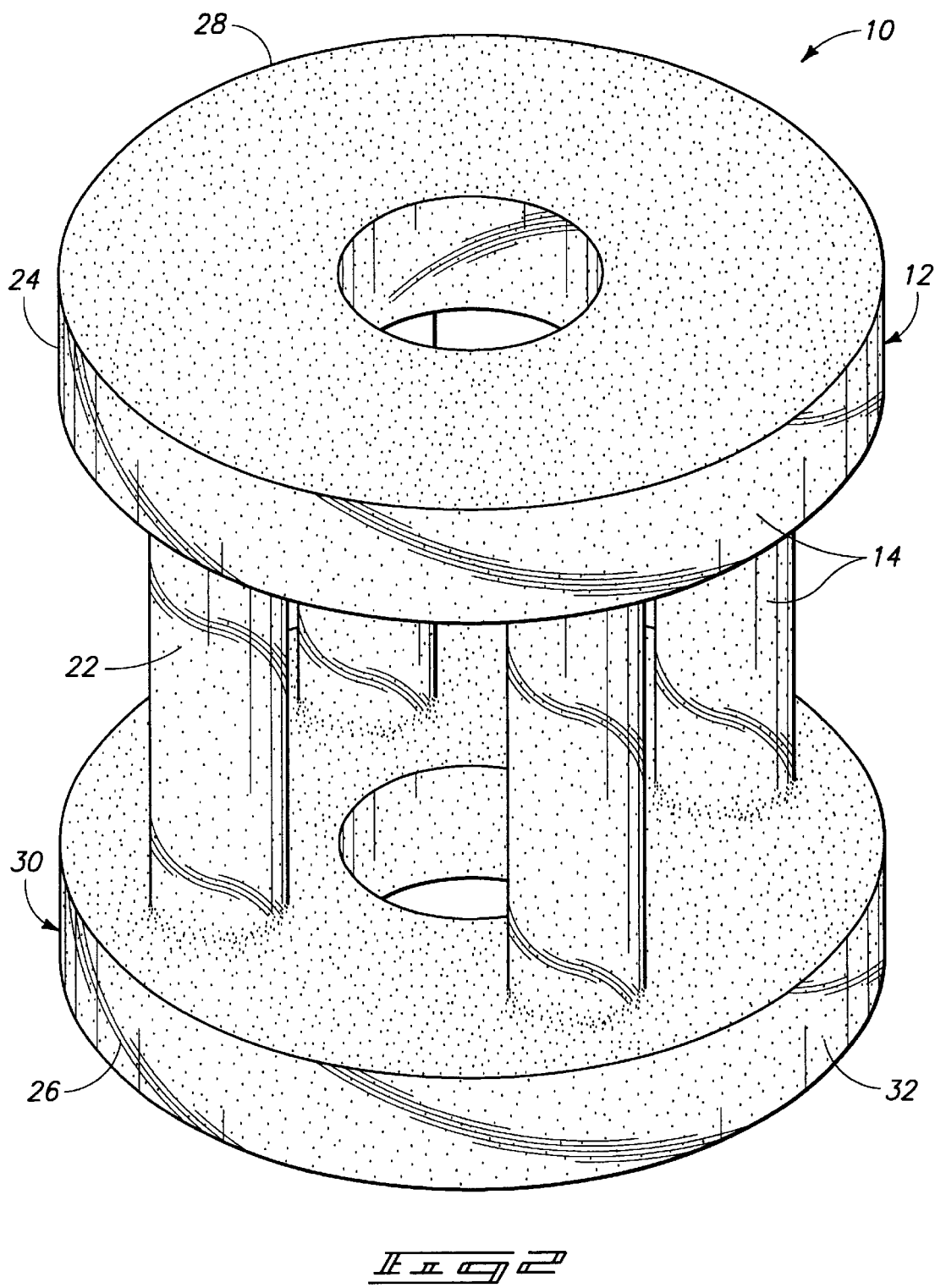

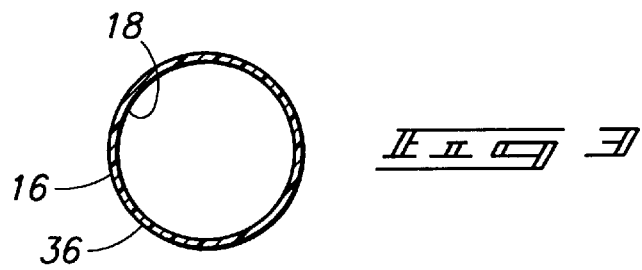
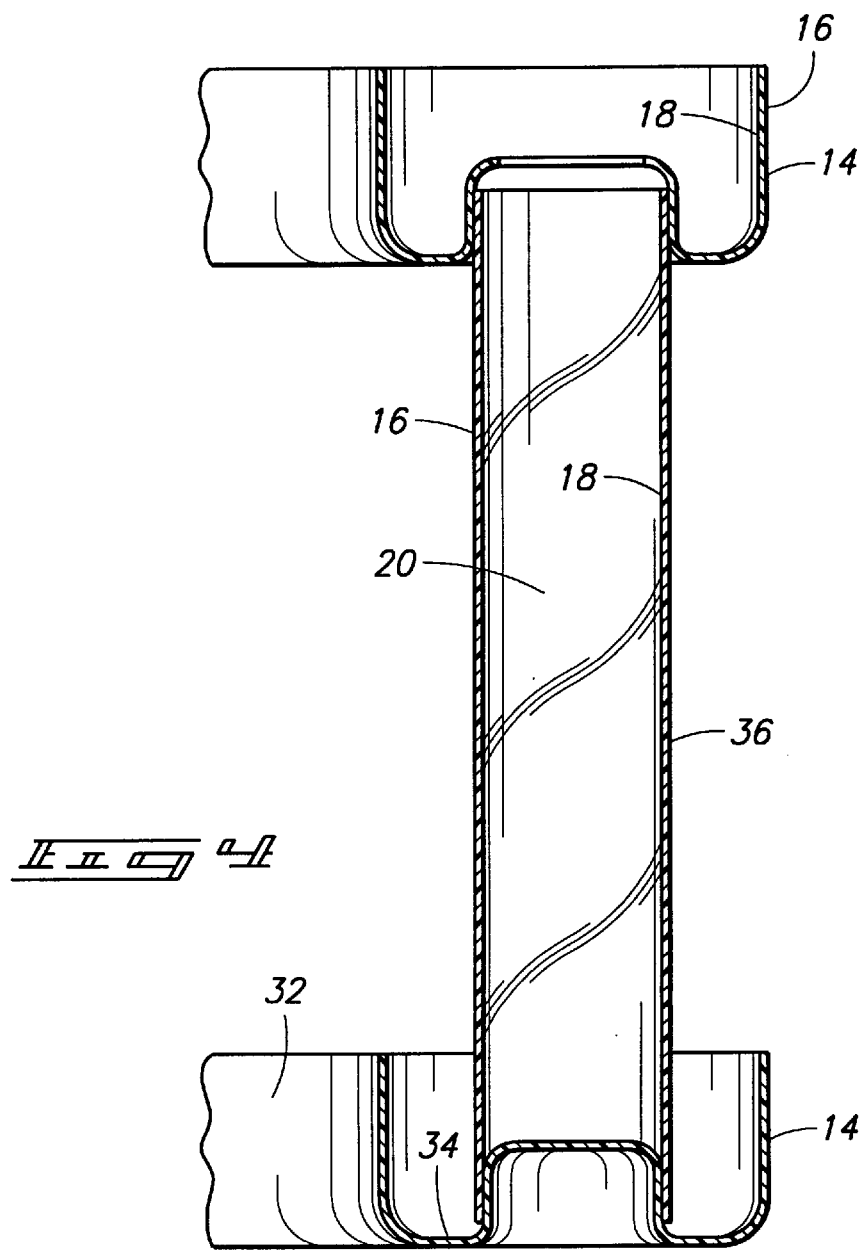

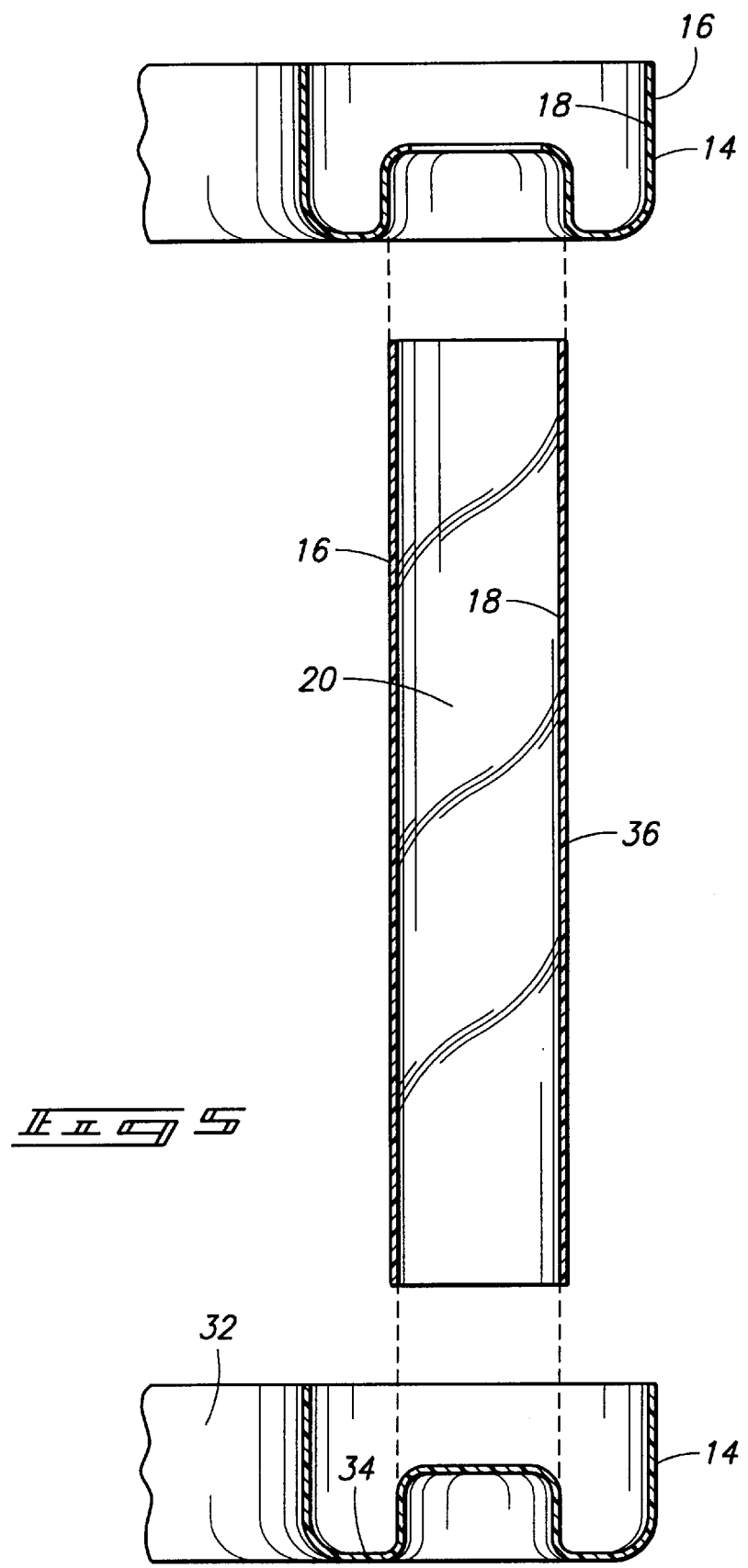

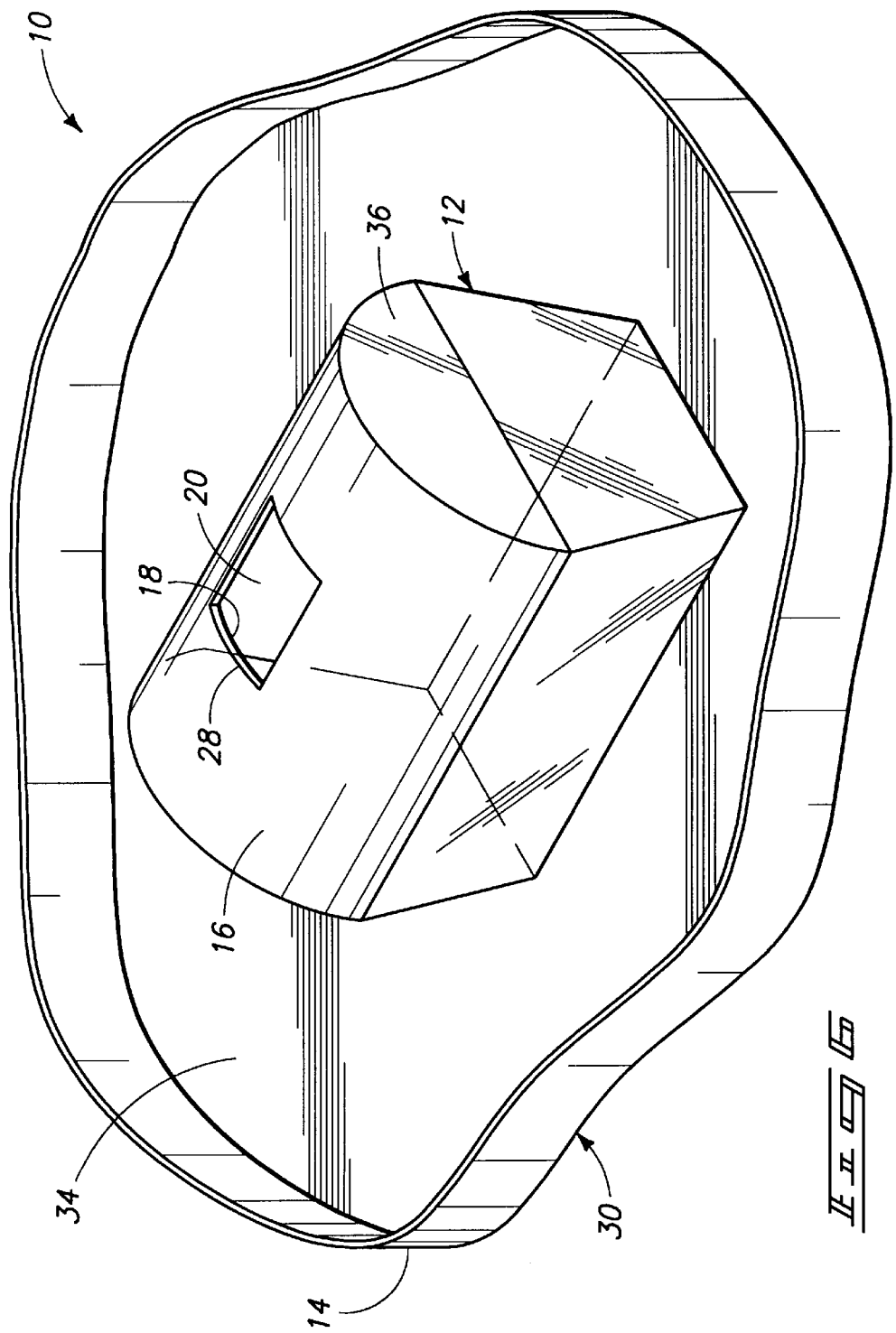

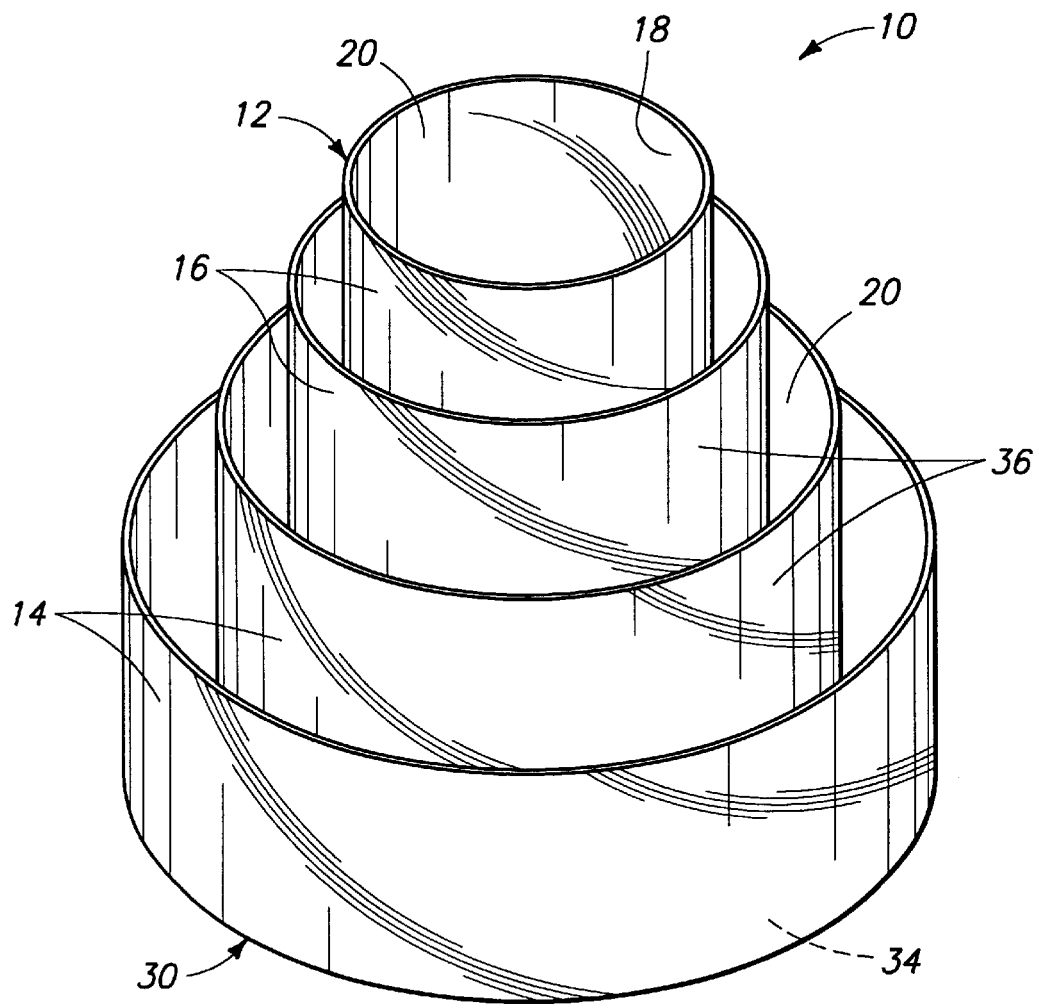

DECORATIVE SUBMERSIBLE FISH TANK SCULPTURE

TECHNICAL FIELD

The present invention relates in general to a decoration and more particularly to submersible decorative sculptures.

BACKGROUND OF THE INVENTION

While the present sculpture is best used in aquariums under water, use may be found in other containers such as terrariums, or as a stand-alone decoration. Since preferred use is inside fish tanks, the following description will be given using a fish tank as an example.

It is common practice for those who enjoy tropical, fresh or saltwater fish, or other aquatic life to provide a habitat within a transparent "fish tank." It is also common that the fish tank be supplied with various decorations to improve visual aesthetics and to lend some measure of variety and habitat for the animals in the tank.

It is desirable to cover the bottom surfaces of fish tanks with an appropriate aquarium gravel. Such gravel functions as a filter medium and contributes to a more natural habitat for the animals. Aquarium gravel also becomes part of a fish tank decoration, and can be purchased in various colors.

Typical fish tank decorations are formed as submersible ceramic sculptures that are intended to rest on the gravel surface. The sculptures may be provided in many different forms, but all (to the present inventor's knowledge) are generally opaque and contrast significantly from the fish tank gravel. There is little color or texture choice for the fish tank owner. Further, the sculptures are typically relatively expensive and some are fragile and difficult to clean.

An object of the present invention is provide a submersible fish tank sculpture that will enable the fish tank owner a choice for decorative color and texture by providing the sculpture in a hollow transparent form that can be filled with fish tank gravel or other particulate materials. Thus the fish tank owner has a variety of choices for coloration of the sculpture.

The present sculpture also has for an objective to provide a submersible sculpture with internal shaped receptacle that, when filled with gravel or the like, forms the material into a particular decorative shape. Thus if a fish tank owner would like a decoration to blend better visually with the aquarium gravel in the tank, the receptacle may simply be filled with the same gravel material used to cover the fish tank bottom. The sculpture will then appear to be an integral part of the gravel bottom, but will be clearly visible above the gravel bed. This lends an interesting and striking visual dimension to the otherwise ordinary appearing fish tank.

The above and still further objects and advantages will become apparent from the following detailed description which, when taken with the accompanying drawings, disclose a preferred mode of the present invention.

BRIEF DESCRIPTION OF THE DRAWINGS

Preferred embodiments of the invention are described below with reference to the following accompanying drawings.

FIG. 2 is a view of the sculpture shown in FIG. 1 only showing the sculpture filled with particulate material such as aquarium gravel;

FIG. 3 is an enlarged fragmented detail sectional view taken along line 3—3 in FIG. 1;

FIG. 4 is an enlarged fragmented detail sectional view taken along line 4—4 in FIG. 1;

FIG. 5 is an exploded view showing components of the exemplary sculpture separated; and FIGS. 6 and 7 are exemplary views showing other decorative forms that the present sculpture may take.

DETAILED DESCRIPTION OF THE PREFERRED EMBODIMENTS

Figure 1:
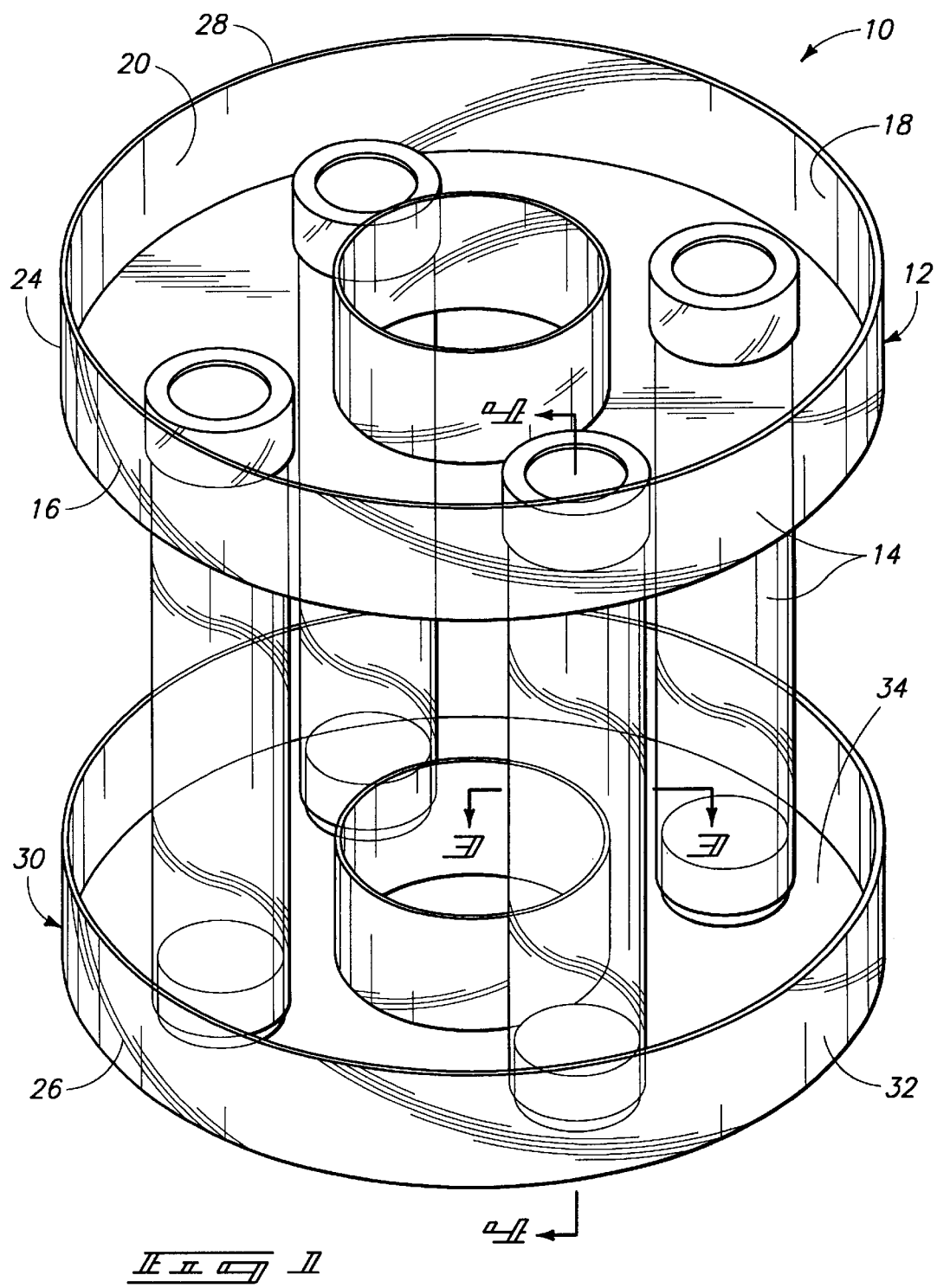
FIG. 1 is a perspective view of a preferred exemplary fish tank sculpture including features of the present invention.

This disclosure of the invention is submitted in furtherance of the constitutional purposes of the U.S. Patent Laws "to promote the progress of science and useful arts" (Article 1, Section 8).

A preferred form of the present decorative submersible sculpture 10 is shown in FIGS. 1–4 of the accompanying drawings. FIGS. 6 and 7 are included also to show alternate exemplary forms of the sculpture 10. Still further forms that are not shown may be readily devised from the teachings of this disclosure. Like reference numerals will be used to identify common elements of each (embodiment exemplified herein.

In general, the present sculpture is comprised of a submersible hollow body 12 formed by a peripheral wall structure 14. The preferred wall structure 14 is formed of a substantially neutral or more preferably a non-buoyant transparent plastic. Forms of plastic are preferred that can be heat formed or injection molded by conventional processes.

The preferred wall structure is rigid and includes a thickness dimension that is no greater than approximately 0.25 inches. It has been found that transparent materials of greater thickness tend to frustrate the intent of the present invention, to provide a shell structure that will become substantially invisible when submerged. Structures with greater wall thickness dimension tend to become undesirably visible underwater.

In all preferred forms, the wall structure 14 includes an external surface 16 that is substantially smooth and undecorated. This is so since the form of the sculpture is not dictated by the external surface 16, but rather by an internal surface 18. Thus it is the internal surface 18 that closely defines the shape of the sculpture. The external configuration may be of a similar shape, due to forming techniques, but is not visible under water, and need not closely define the sculptural configuration. It is preferred that the external surface be relatively smooth or textured so as not to cause any undesired reflections. A smooth external surface thus contributes to the "invisible" appearance of the wall 14 or any external surface of the sculpture when submerged.

The internal surface 18 of the wall structure defines an internal receptacle 20 of a prescribed decorative shape that is configured to be substantially filled by a visually opaque particulate medium 22 (FIG. 2) such as aquarium gravel, sand, or another particulate material. The medium 22 may be poured into the receptacle 20 to be formed by the receptacle 20 into the prescribed decorative shape. Once again, the shape defined may be any of a variety of decorative configurations, as indicated by the few examples illustrated.

The preferred hollow body includes a top 24 and a bottom end 26. It also includes at least one top, upwardly facing opening 28 (note the several openings 28 in the FIG. 7 configuration) formed in the hollow body and opening into the receptacle, the top opening being configured to receive particulate materials. With the opening 28 facing upwardly, particulate medium may be poured into the receptacle 20 to the top opening and then span the opening (when the receptacle is filled) without spilling over or adversely affecting the configuration of the sculpture. Each opening is provided in such a manner that the particulate material spanning the opening will form a visual part of the sculpture (see FIG. 2).

Thus, the wall structure is transparent and configured such that when the receptacle is at least substantially filled with visually opaque particulate medium 20, the medium is formed into the prescribed decorative shape and is visible through the wall structure and appears to be in a solid, self-supporting state. The wall structure becomes substantially invisible when submerged in the fish tank. The result is a strikingly decorative, solid appearing structure of an apparent texture and coloration that is chosen by the user.

The particular form illustrated in FIGS. 1–5 exemplifies details of the preferred construction. It is noted that the wall configuration shown is consistent in thickness. This construction is preferred to maintain a consistent visual appearance and to enable the shape to be formed by conventional relatively inexpensive techniques such as thermoforming.

It is also noted, especially in FIGS. 4 and 5, that the sculpture may be produced in several interfitting sections. This presents an advantage of reducing shipping and storage size, and allows for easy assembly by the ultimate purchaser. This is also an advantage for the user who may wish to clean the sculpture periodically, then re-fill the receptacle with fresh particulate medium.

The above brings up a still further advantage of the present sculpture. The particulate medium will function not only as a decoration when in a fish tank, but also as a filter medium. Thus the sculpture has a distinct utilitarian function in addition to a unique aesthetic appearance.

More specifically, the configurations shown include a base 30 with a peripheral side wall 32 projecting upwardly from a bottom wall 34, the side wall being transparent. One or more transparent hollow upright members 36 extend upwardly relative to the base bottom wall 34, and define the internal surface 18 of a prescribed decorative configuration.

The base and transparent hollow upright member are configured to receive solid particulate materials to form a visible decorative structure with the side wall and transparent hollow upright being substantially invisible when submerged. The opening or openings in the hollow upright member configured to receive solid particulate materials therethrough and provide open access to the internal surface.

Solid particulate materials 22 filling the internal receptacle will be visible through the wall structure and visually appear in water as a solid body of the prescribed decorative shape.

To use the present sculpture, the user simply assembles the various sections (if the sculpture is so provided). Now a selected particulate medium is poured into the receptacle through the upwardly facing opening or openings to the level of the opening or openings, filling the receptacle. The particulate material spanning the opening or openings will form a top surface of the sculpture, as exemplified by FIG. 2. This completes formation of the sculpture and all that is left is to submerge the sculpture in the fish tank. This is done by slowly lowering the sculpture into the water, allowing the air in the receptacle to be gradually displaced with water (which enters through the opening or openings). The weight of the sculpture will then allow it to descend to the bottom of the tank, at any location selected by the user.

A preferred process for producing a decorative submersible fish tank sculpture includes the following steps:

1. Providing a hollow submersible body with a transparent peripheral wall structure (14) having an external surface (16) and an internal surface (18); and 2. Forming the internal surface (18) into a receptacle (20) of a prescribed decorative shape configured to be substantially filled by a visually opaque particulate medium (22) and formed by the internal receptacle (20) into the prescribed decorative shape such that when the receptacle is substantially filled with visually opaque particulate medium (22), the medium is visible through the wall structure and visually appears to be in a solid, self supporting state, and the wall structure is substantially invisible.

The above steps may be performed using a transparent plastic material and heat forming or molding techniques. This is preferably accomplished while forming the external surface (16) to be substantially smooth and undecorative, again to minimize the chance that the external surface will become visible when submerged.

It is further preferred that the forming step be completed in such a manner that the wall thickness not surpass 0.25 inches. This is preferred as indicated above, to minimize the chance that the wall material will become visible when submerged.

It is also preferred that a further step include providing an opening (28) in the hollow submersible body leading into the receptacle (20). The preferred opening may be formed in the forming or molding process, or the opening may be cut following formation of the hollow body.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A decorative submersible sculpture, comprising:
   a submersible hollow body comprising: a peripheral wall structure, wherein said wall structure is transparent and defines an internal receptacle of a decorative shape and said receptacle is configured to be substantially filled with visually opaque particulate medium, wherein the medium is formed into the decorative shape and is visible through the wall structure and visually appears to be in a solid state, and the wall structure is substantially invisible.

2. The decorative submersible sculpture as recited by claim 1 wherein the wall structure comprises a substantially non-buoyant transparent plastic.

3. The decorative submersible sculpture as recited by claim 1 wherein the external surface of the wall structure is substantially smooth and undecorated.

4. The decorative submersible sculpture as recited by claim 1 wherein the wall structure is rigid and has a thickness dimension that is no greater than approximately 0.25 inches.

5. The decorative submersible sculpture as recited by claim 1 wherein the hollow body includes a top and a bottom end and further, an opening leading into the receptacle adjacent the top end said opening being configured to receive particulate materials.

6. The decorative submersible sculpture as recited by claim 1 wherein the hollow body comprises an opening leading into the receptacle, said opening configured to receive particulate materials.

7. A process for producing a decorative submersible fish tank sculpture, said process comprising:

providing a hollow submersible body with a transparent peripheral wall structure having an external surface and an internal surface;

forming the internal surface into a receptacle of a decorative shape and configured to be substantially filled with visually opaque particulate medium wherein said medium is visible through the wall structure and appears to be in a solid, self supporting state, and the wall structure is substantially invisible.

8. The process for producing a decorative submersible fish tank sculpture as defined by claim 7, comprising a further step of providing an opening in the hollow submersible body leading into the receptacle.

9. The process for producing a decorative submersible fish tank sculpture as defined by claim 7, wherein the external surface of the wall structure is substantially smooth and undecorated.

10. The process for producing a decorative submersible fish tank sculpture as defined by claim 7, wherein the hollow submersible body is comprised of transparent plastic material.

11. The process for producing a decorative submersible fish tank sculpture as defined by claim 7, wherein the hollow submersible body is comprised of transparent plastic material and has a thickness dimension between the external and internal surfaces of no greater than approximately 0.25 inches.

12. A decorative submersible fish tank sculpture, comprising:

a base with a peripheral side wall projecting upwardly from a bottom wall, wherein the side wall is transparent;

a transparent hollow upright member extending upwardly relative to the base bottom wall, and defines an internal receptacle of a decorative shape, wherein the internal receptacle is configured to be substantially filled with solid particulate materials to form a visible decorative structure with the side wall and the transparent hollow upright member being substantially invisible;

an opening in the hollow upright member providing open access to the internal surface wherein the opening receives the solid particulate materials therethrough and whereby the solid particulate materials that fill the internal receptacle are visible through the wall structure and visually appear in water as a solid body.

13. The decorative submersible fish tank sculpture as recited by claim 12 wherein the side wall and hollow upright member comprise a substantially non-buoyant transparent plastic.

14. The decorative submersible fish tank sculpture as recited by claim 12 wherein the side wall and hollow upright member comprise external surfaces that are substantially smooth and undecorated.

15. The decorative submersible fish tank sculpture as recited by claim 12 wherein the side wall and hollow upright member are rigid and comprise a common thickness dimension that is no greater than approximately 0.25 inches.

16. The decorative submersible fish tank sculpture as recited by claim 12 wherein the hollow upright member includes a top and a bottom end and wherein said opening is formed in the top end and opens into the hollow upright member, said top opening being configured to receive particulate materials.

17. The decorative submersible fish tank sculpture as recited by claim 12 wherein said opening is complimentary to a portion of the decorative shape.

\* \* \* \* \*